United States Patent [19]

Deland

[11] 4,443,922

[45] Apr. 24, 1984

[54] EXTRACTING TOOL

[76] Inventor: Francois Deland, 250 Montigny, Mont-St-Hilaire J3H 2T9, Quebec, Canada

[21] Appl. No.: 291,786

[22] Filed: Aug. 10, 1981

[51] Int. Cl.[3] .............................................. B23P 19/04

[52] U.S. Cl. ........................................ 29/254; 29/259; 29/275

[58] Field of Search ................. 29/258, 259, 260, 261, 29/262, 263, 265, 254, 275, 255

[56] References Cited

U.S. PATENT DOCUMENTS

| | | | |
|---|---|---|---|
| 1,241,819 | 10/1917 | Campbell | 29/265 |
| 1,550,285 | 8/1925 | Sherman | 29/261 X |
| 1,570,338 | 1/1926 | Davis | 29/262 |
| 1,893,414 | 1/1933 | Johnson et al. | 29/275 |
| 1,964,023 | 6/1934 | Armstrong | 29/262 X |
| 2,377,304 | 2/1943 | Appel . | |
| 2,614,318 | 10/1952 | McCord | 29/263 |
| 2,646,619 | 8/1950 | McCord . | |
| 2,755,540 | 7/1956 | Crozier | 29/265 |
| 3,529,497 | 6/1968 | Brooks . | |
| 3,588,983 | 6/1971 | Hoy | 29/261 X |
| 3,611,539 | 10/1971 | Meaden, Jr. | 29/263 X |
| 3,611,540 | 10/1971 | Gibu . | |
| 4,059,883 | 11/1977 | Osborne . | |

*Primary Examiner*—Frederick R. Schmidt
*Assistant Examiner*—Steven P. Schad
*Attorney, Agent, or Firm*—Schwartz, Jeffery, Schwaab, Mack, Blumenthal & Koch

[57] ABSTRACT

A tool for extracting an object from an assembled arrangement, for example, a low and reverse gear clutch housing from a planetary gear arrangement. The tool is made of an outer cylindical hollow member and an inner cylindrical hollow member telescopingly arranged in the outer cylindrical member such that the outer cylindrical member is telescopingly movable relative to the inner cylindrical member. Elongated legs extend from the outer surface of the outer cylinder over the outer surface of the inner cylinder, and each leg is made of a flexible material and includes a cam at the free end thereof. A stop consisting of three fins is disposed inwardly of the inner end of the inner cylindrical member.

7 Claims, 4 Drawing Figures

EXTRACTING TOOL

BACKGROUND OF INVENTION (a) Field of the Invention

The invention relates to a tool for extracting an object, having a central circular opening, from an assembled arrangement. More specifically, the invention relates to such a tool useful for extracting a low and reverse gear clutch housing from a planetary gear arrangement.

(b) Description of Prior Art

Because of the difficulties in extracting objects from assembled arrangements, tools have been developed for, for example, extracting ignition key cylinders, bushings, dies, etc. from their housings, and some such tools are illustrated, by way of example, in U.S. Pat. No. 1,893,414, Johnson et al, issued Jan. 3, 1933; U.S. Pat. No. 2,377,304, Appel, issued June 5, 1945; U.S. Pat. No. 2,614,318, McCord, issued Oct. 21, 1952; U.S. Pat. No. 2,646,619, McCord, issued July 28, 1953; U.S. Pat. No. 3,529,497, Brooks, issued Sept. 22, 1970; U.S. Pat. No. 3,611,539, Meaden, Jr., issued Oct. 12, 1971; and U.S. Pat. No. 4,059,883, Osborne, issued Nov. 29, 1977.

However, none of these tools are satisfactory in their assigned tasks, nor will they provide a solution to the specific task of extracting a low and reverse gear housing from a planetary gear arrangement.

SUMMARY OF INVENTION

It is therefore an object of the invention to provide a new tool for extracting an object having a central circular opening, from an assembled arrangement.

It is a more specific object of the invention to provide a new tool for extracting a low and reverse gear clutch housing from a planetary gear arrangement.

In accordance with an embodiment of the invention there is provided a tool for extracting an object, having a central circular opening, from an assembled arrangement, which comprises: an outer, hollow, cylindrical member; an inner, hollow, cylindrical member; said inner cylindrical member being telescopingly mounted in said outer cylindrical member such that said outer cylindrical member is telescopingly movable relative to said inner cylindrical member; means for telescopingly moving said outer cylindrical member relative to said inner cylindrical member; leg means comprising at least one elongated leg member, made of a flexible material, extending longitudinally from the outer surface of said outer cylindrical member and over the outer surface of said inner cylindrical member, said leg member having camming means at the free end thereof; and stop means disposed on the outer surface of said inner cylindrical member and inwardly spaced from the free end thereof; wherein the free end of said inner cylindrical member is adapted to be inserted in said circular opening of said object, until said stop means abuts a side surface of said object, whereupon said means for moving is adapted to move said outer cylindrical member, and said leg, outwardly so that said camming means engages the free end of said inner cylindrical member to force said leg outwardly against the inner surface of said circular opening of said object to thereby tightly engage the tool against said object to facilitate the extraction of said object from said arrangement.

In accordance with a further embodiment of the invention there is provided a tool for extracting a low and reverse gear clutch housing, having a central circular opening, from a planetary gear arrangement, which comprises: (A) an outer hollow cylindrical member having a back wall and a threaded circular central opening through said back wall; (B) an inner cylindrical member having a back wall and a central opening therethrough; (C) said inner cylindrical member being telescopingly mounted in said outer cylindrical member such that said outer cylindrical member is telescopingly movable relative to said inner cylindrical member; (D) means for telescopingly moving said outer cylindrical member relative to said inner cylindrical member, comprising: (i) a shaft having a threaded inward end and an outward end, the threads of said shaft matingly engaging the threads of said circular central opening of said back wall of said outer cylindrical member so that said shaft threadingly extends therethrough; (ii) bolt means extending through said opening in said back wall of said inner cylindrical member and attached to the free end of said shaft means so that said shaft means is attached to said inner cylindrical member; (iii) whereby rotation of said shaft member will cause telescoping movement of said outer cylindrical member relative to said inner cylindrical member; (E) leg means comprising three elongated leg members, made of a flexible material, and extending longitudinally from the outer surface of said outer cylindrical member and over the outer surface of said inner cylindrical member, each leg member having camming means at the free ends thereof, said leg members being equally spaced around the perimeter of said outer cylindrical member; (F) stop means comprising three fins equally spaced around the perimeter of the outer surface of said inner cylindrical member and inwardly spaced from the free end thereof; (G) whereby the free end of said inner cylindrical member is adapted to be inserted in said circular opening of said object, until said stop means abuts a side surface of said object, whereupon said means for moving is adapted to move said outer cylindrical member, and said leg, outwardly so that said camming means engages the free end of said inner cylindrical member to force said leg outwardly against the inner surface of said circular opening of said object to thereby tightly engage the tool against said object to facilitate the extraction of said object from said arrangement; (H) hammer means slidingly mounted on said shaft; and (I) a handle at the outward end of said shaft including a hammer stop; (J) whereby said object can be dislodged from said assembled arrangement by hammering the hammer against said handle stop.

BRIEF DESCRIPTION OF DRAWINGS

The invention will be better understood by an examination of the following description, together with the accompanying drawings, in which.

DESCRIPTION OF PREFERRED EMBODIMENTS

Figure 1:
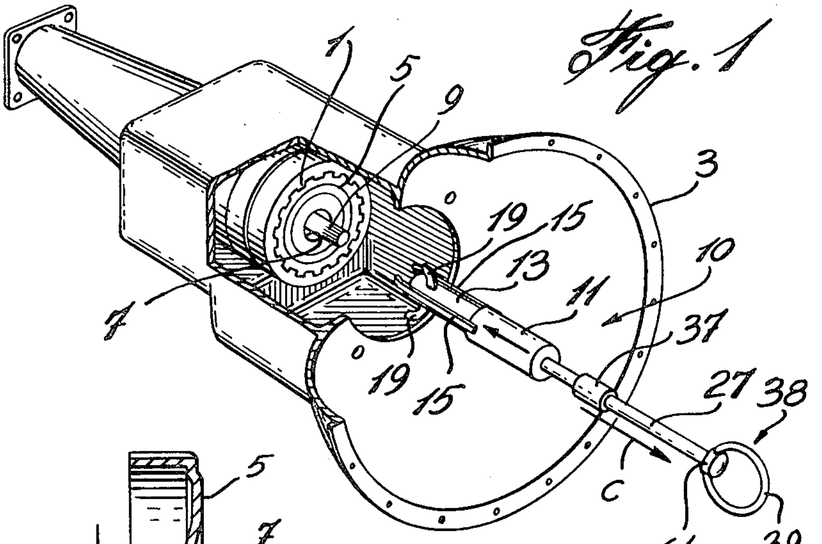
FIG. 1 is a perspective view of the planetary gear arrangement and the novel tool.

FIG. 1 illustrates an assembled planetary gear arrangement 1 in its housing 3. Low and reverse gear clutch housing 5 constitutes a part of the arrangement and the element 5 has a central circular opening 7 through which extends shaft 9 of the arrangement 1.

The novel tool, illustrated generally at 10, includes an outer hollow cylindrical member 11 and an inner hollow cylindrical member 13, the members 11 and 13 being arranged for telescoping movement relative to each other as will be discussed below.

Extending longitudinally from the outer surface of the free end of 11, and over the outer surface of 13, is at least one elongated leg member 15 made of a flexible material. In the illustrated embodiment, there are three such members equally spaced around the perimeter of the outer surface of 11, and each of the members 15 is made of a flexible material and includes camming means 17 at the free ends thereof. The camming means may comprise an inwardly extending, somewhat globular protrusion.

Extending around the outer surface of 13, and inwardly spaced from the free end thereof by a predetermined amount are stop means 19. In the illustrated embodiment, the stop means comprise three fins equally spaced around the perimeter of the outer surface of 13. It will be appreciated that other stop means, for example, a simple circular band around the perimeter of the outer surface of 13, could be used.

The tool also includes means, illustrated generally at 21, for telescopingly moving outer cylindrical member 11 relative to inner cylindrical member 13. The means 21 includes a back wall 23 of 11 having a threaded central circular opening 25. Shaft 27, having a threaded inward end 29, extends through the opening 25. The threads on 29 are adapted to matingly engage the threads in opening 25.

Back wall 31 of member 13 also has a central opening 33, and the member 13 is attached to the shaft 27 by fastening means 35, such as a bolt which extends through the opening 33 and is fastened to the shaft on the other side of the back wall 31.

A hammer means 37, comprising a hollow cylinder, is mounted for movement along the shaft 27 for purposes to be explained below.

The outward end 38 of the shaft 27 includes a handle 39 with a stop 41.

Figure 2:
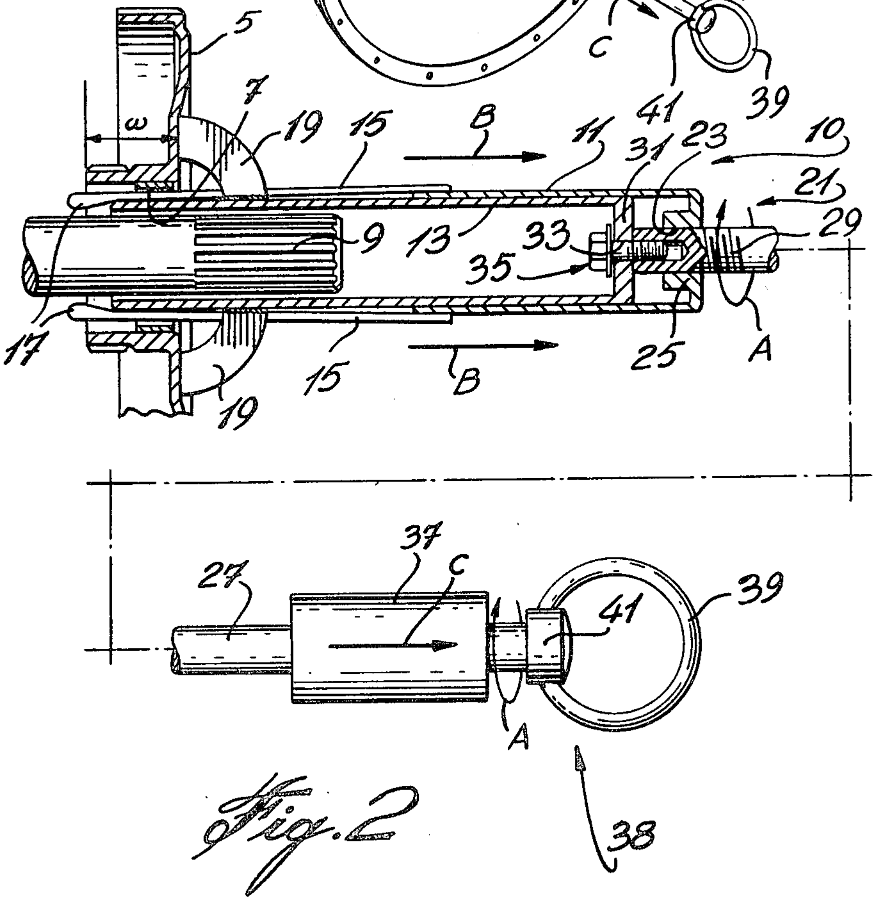
FIG. 2 is a plan view, partly in section, of the tool mounted on the shaft of the planetary gear arrangement before the tool engages the low and reverse gear clutch housing.
Figure 3:
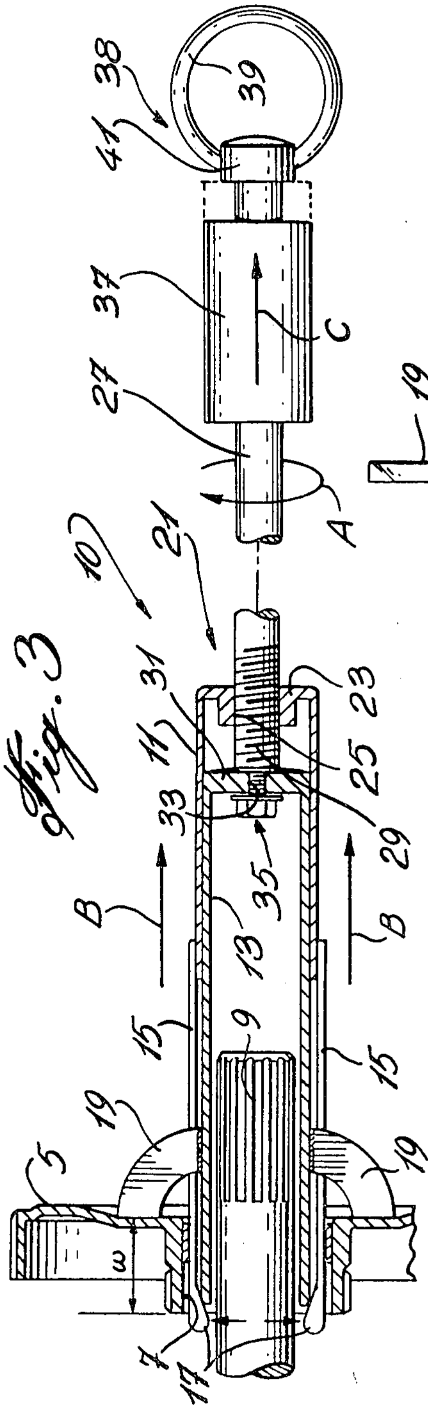
FIG. 3 is a view similar to FIG. 2 but with the tool engaging the low and reverse gear clutch housing.
Figure 4:
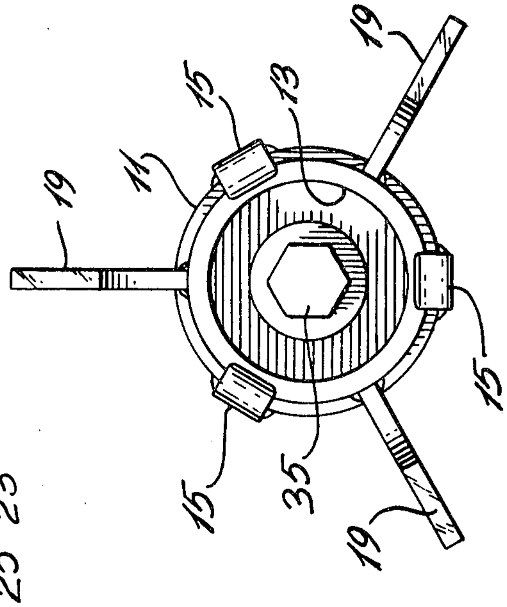
FIG. 4 is an end view of the tool.

In operation, the tool works as follows:

The cylinder 13 is mounted over the shaft 9 and the tool is moved inwardly until the stop means 19 abuts the outer face of the clutch housing 5 as shown in FIGS. 2 and 3. As seen in FIG. 2, the tool is now loosely disposed in the opening 7 of the element 5.

The shaft 27 is now rotated in the direction of the arrow A so that, because of the threads at 25 and 29, the outer cylindrical member 11 is forced outwardly, in the direction of arrows B, bringing with it legs 15 and globes 17. The free end of 13 engages the approaching globes 17 to force the free ends of the legs outwardly against the inner surface of the opening 7. This will cause the cylindrical member 13 to be tightly held against the inner surface of opening 7, i.e., the tool will be tightly held to the clutch housing 5. The shaft should be rotated until it is no longer possible to rotate it.

With the tool now tightly gripping the clutch housing 5, the tool is pulled outwardly by the handle 39 to extract the clutch housing 5 from the gear arrangement 3. Should it prove impossible to dislodge the clutch housing by merely pulling on the handle, the hammer would be used to provide a greater dislodging force. This is accomplished by first sliding the hammer 37 along the shaft 27 until it abuts or is close to the outer cylindrical member 11. It is then pushed forcefully in the direction of the arrow C until it hammers against the stop 41 to provide a hammering force to dislodge the clutch housing from the planetary gear arrangement.

Although a specific embodiment has been above described, this was for the purpose of illustrating, but not limiting, the invention. Various modifications, which will come readily to the mind of one skilled in the art, are within the scope of the invention, as defined in the appended claims.

I claim:

1. A tool for extracting an object, having a central circular opening, from an assembled arrangement, comprising:

an outer, hollow, cylindrical member;

an inner, hollow, cylindrical member having an open free end;

said inner cylindrical member being telescopingly mounted in said outer cylindrical member such that said open free end extends from said outer cylindrical member and such that said outer cylindrical member is telescopingly movable relative to said inner cylindrical member;

means for telescopingly moving said outer cylindrical member relative to said inner cylindrical member;

leg means comprising at least one elongated leg member, made of a flexible material, extending longitudinally from the outer surface of said outer cylindrical member and over the outer surface of said inner cylindrical member, said leg member comprising camming means at a free end thereof, said camming means being oriented toward the inner cylindrical member such that said camming means is forced radially outwardly of said inner cylindrical member when said outer hollow cylindrical member is moved relative to said inner hollow cylindrical member in a manner to bring said camming means into engagement with said inner cylindrical member free end; and stop means disposed on the outer surface of said inner cylindrical member and inwardly spaced from the free end thereof;

wherein said open free end of said inner cylindrical member is adapted to be inserted in said circular opening of said object, until said stop means abuts a side surface of said object, whereupon said means for moving is adapted to move said outer cylindrical member, and said leg, outwardly so that said camming means engages the free end of said inner cylindrical member to force said leg outwardly against the inner surface of said circular opening of said object to thereby tightly engage the tool against said object to facilitate the extraction of said object from said arrangement;

said means for moving comprising:

a back wall on said outer cylindrical member having a threaded circular central opening therethrough:

a back wall on said inner cylindrical member having an opening therethrough;

a shaft having a threaded inward end and an outward end, the threads of said shaft matingly engaging the threads of said circular control opening of said back wall of said outer cylindrical member so that said shaft threadingly extends therethrough;

bolt means extending through said opening in said back wall of said inner cylindrical member and attached to the inward end of said shaft so that said shaft is attached to said inner cylindrical member;

whereby rotation of said shaft will cause telescoping movement of said outer cylindrical member relative to said inner cylindrical member.

2. A tool as defined in claim 1 wherein said leg means comprises three leg members equally spaced around the perimeter of the outer surface of said outer cylindrical member.

3. A tool as defined in claim 1 wherein said stop means comprises three fins equally spaced around the perimeter of the outer surface of said inner cylindrical member.

4. A tool as defined in claim 1 and further including hammer means slidingly mounted on said shaft; and a handle at the outward end of said shaft including a hammer stop;

whereby said object can be dislodged from said assembled arrangement by hammering the hammer against said handle stop.

5. A tool as defined in claim 1, wherein said camming means extends past said free end of said inner hollow cylindrical member.

6. A tool for extracting a low and reverse gear clutch housing, having a central circular opening, from a planetary gear arrangement, comprising:

(A) an outer hollow cylindrical member having a back wall and a threaded circular central opening through said back wall;

(B) an inner cylindrical member having a back wall and a central opening therethrough;

(C) said inner cylindrical member being telescopingly mounted in said outer cylindrical member such that said outer cylindrical member is telescopingly movable relative to said inner cylindrical member;

(D) means for telescopingly moving said outer cylindrical member relative to said inner cylindrical member, comprising:

(i) a shaft having a threaded inward end and an outward end, the threads of said shaft matingly engaging the threads of said circular central opening of said back wall of said outer cylindrical member so that said shaft threadingly extends therethrough;

(ii) bolt means extending through said opening in said back wall of said inner cylindrical member and attached to the inward end of said shaft so that said shaft is attached to said inner cylindrical member;

(iii) whereby rotation of said shaft member will cause telescoping movement of said outer cylindrical member relative to said inner cylindrical member;

(E) leg means comprising three elongated leg members, made of a flexible material, and extending longitudinally from the outer surface of said outer cylindrical member and over the outer surface of said inner cylindrical member, each leg member having camming means at the free ends thereof, said leg members being equally spaced around the perimeter of said outer cylindrical member;

(F) stop means comprising three fins equally spaced around the perimeter of the outer surface of said inner cylindrical member and inwardly spaced from the free end thereof;

(G) whereby the free end of said inner cylindrical member is adapted to be inserted in said central circular opening of said low and reverse gear clutch housing until said stop means abuts a side surface of said object, whereupon said means for moving is adapted to move said outer cylindrical member, and said leg, outwardly so that said camming means engages the free end of said inner cylindrical member to force said leg outwardly against the inner surface of said circular opening of said object to thereby tightly engage the tool against said object to facilitate the extraction of said object from said arrangement;

(H) hammer means slidingly mounted on said shaft; and (I) a handle at the outward end of said shaft including a hammer stop;

(J) whereby said object can be dislodged from said assembled arrangement by hammering the hammer against said handle stop.

7. A tool as defined in claim 6, wherein said camming means extends beyond said free end of said inner cylindrical member and are oriented radially inward of said inner cylindrical member.

* * * * *